United States Patent [19]
Cox et al.

[11] Patent Number: 5,643,345
[45] Date of Patent: Jul. 1, 1997

[54] AUTOMOTIVE AIR BAG FILTER WITH SUPPORT MEMBER

[75] Inventors: Matthew A. Cox, Bountiful; Alan J. Ward, North Ogden; Michael P. Jordan, South Weber, all of Utah

[73] Assignee: Morton International, Inc., Chicago, Ill.

[21] Appl. No.: 529,824

[22] Filed: Sep. 18, 1995

[51] Int. Cl.$^6$ .................................................... B01D 35/02
[52] U.S. Cl. .................... 55/385.3; 55/410; 55/418; 55/523; 55/DIG. 5; 264/DIG. 48; 280/737; 280/740
[58] Field of Search .......................... 55/385.3, 486, 55/487, 510, 523, 525, 410, 418, 419, DIG. 5; 280/737, 740; 264/263, DIG. 48

[56] References Cited

U.S. PATENT DOCUMENTS

| | | | |
|---|---|---|---|
| 5,087,070 | 2/1992 | O'Loughlin et al. | 280/740 |
| 5,204,068 | 4/1993 | O'Loughlin et al. | 55/525 X |
| 5,215,721 | 6/1993 | Tasaki et al. | 55/523 X |
| 5,290,060 | 3/1994 | Smith | 280/737 |
| 5,308,370 | 5/1994 | Kraft et al. | 55/487 |
| 5,466,420 | 11/1995 | Parker et al. | 280/740 X |
| 5,503,806 | 4/1996 | Fulmer et al. | 280/740 X |
| 5,531,474 | 7/1996 | Osborne et al. | 280/740 |

FOREIGN PATENT DOCUMENTS

| | | | |
|---|---|---|---|
| 9321037 | 10/1993 | WIPO | 280/740 |

*Primary Examiner*—Richard L. Chiesa
*Attorney, Agent, or Firm*—Roger J. French; Gerald K. White

[57] ABSTRACT

A filter for an inflatable vehicle occupant restraint inflator includes a tubular filter element having a generally cylindrical interior surface and a generally cylindrical outer surface having a predetermined diameter and a predetermined axial length and spaced radially outwardly from the inner surface. A tubular support member surrounds the outer surface. The support member is of an axial length equal to at least a major portion of the axial length of the outer surface and has an inner diameter substantially similar to the diameter of the outer surface for close surrounding engagement therewith. The support member has a plurality of through openings.

15 Claims, 1 Drawing Sheet

AUTOMOTIVE AIR BAG FILTER WITH SUPPORT MEMBER

BACKGROUND OF THE INVENTION

This invention relates in general to inflatable vehicle occupant restraint systems, also known as air bag restraint systems. More particularly, the invention relates to a novel and improved filter construction for an inflator of such a system and an inflator module employing such a filter construction, and a method of making such a filter.

Inflator modules for air bag restraint systems of the pyrotechnic type typically include a housing which contains a pyrotechnic igniting charge and a pyrotechnic gas generating material. Usually, separate sections or chambers are provided respectively for the igniting charge and the gas generating material. The housing defines internal ports for the combustion gases of the igniting charge to contact the gas generating material, causing a reaction to produce a larger quantity of gas. Cooperatively, the housing includes a number of exit ports for allowing the generated gas to pass into and inflate an inflatable cushion.

Commonly, the gas generating material produces a relatively high temperature gas which contains a quantity of particulate material. Accordingly, it is common to filter the gas before it passes through the housing ports and into the inflatable cushion, both to remove the particulate material and to cool the gas somewhat.

For driver side air bags, the housing, as well as the inflatable cushion, are typically located in the steering wheel, and typically, the housing is formed as a short cylinder with its longitudinal axis parallel to the axis of rotation of the steering wheel. Passenger side air bags usually employ a cushion of larger volume, and commonly more space is provided for the mounting of the inflator than in the case of the driver side air bag mounted in the steering wheel. Thus, a passenger side inflator housing is typically formed as a relatively elongated cylinder which may be somewhat smaller in diameter than a driver side inflator but provides additional volume through its increased axial length for accommodating additional gas generating material.

In the case of a driver side inflator, the gas exit ports for delivering gas to the inflatable cushion may be placed either in a radial arrangement or an axial arrangement. In axial designs, the ports are located on the upper longitudinal end of the cylindrical inflator housing, whereas in radial designs, the ports are located on the radially outer face of the cylindrical inflator housing. The present invention relates to the latter or radial design.

In the radial arrangement, the filter is generally a tubular member located radially inwardly of the housing exit ports. In the past, the filter has been constructed as a composite filter structure having a number of layers of filtering or other materials which are assembled to provide the composite filter unit. However, the present invention provides a much simpler filter employing a unitary, integrally formed ceramic filter element of a generally tubular form. The filter element may be formed from, but is not limited to, ceramic, powdered metal, metal fiber, or a combination of two or more of these porous, relatively brittle materials.

In order to cause the flow of gas through as large an area of the filter as possible so as to achieve both efficient filtering and maximum gas flow, it is often desirable to have a plenum space between the filter and the inner wall of the inflator housing. However, in the case of a unitary filter, the outer peripheral wall of the filter will lack external circumferential or radial support, by virtue of being spaced apart from the inner wall of the housing rather than being placed thereagainst. Generally speaking, the unsupported tubular filter element will experience hoop stress upon the rapid generation of gas and resultant gas pressure exerted radially outwardly on the filter. Lack of radial external support can result in tensile failure of the generally tubular or ring-like filter due to this tensile hoop stress.

A second type of air bag system of the so-called hybrid/ blowdown design as described in OS Patent No. 5,290,060 employs a somewhat simpler pyrotechnic igniter structure in connection with a sealed tube of gas (usually argon) which is coupled to the inflatable cushion. The igniter member serves to dislodge a seal from the tube of gas and allow the gas to rapidly fill the inflatable cushion. While filters are presently not employed in this latter type of design, a filter in accordance with the invention could be so employed if desired.

OBJECTS AND SUMMARY OF THE INVENTION

Accordingly, it is an object of the invention to provide a novel and improved filter for an inflatable vehicle occupant restraint module.

Another object is to provide such a filter which is relatively simple and inexpensive to construct and assemble with the inflator module and yet highly reliable in operation.

A further object is to provide such a filter employing a unitary filter element formed from ceramic, powdered metal, metal fiber, or a combination of two or more of these materials.

A related object is to provide a method for constructing a filter in accordance with the foregoing objects.

A further related object is to provide an inflator module employing a filter of the foregoing type, in which a plenum is formed between the filter element and inflator housing exit ports and yet the filter element is protected against the effects of hoop stress.

Briefly, and in accordance with the foregoing objects, the invention provides a filter comprising a tubular filter element having a generally cylindrical interior surface and a generally cylindrical outer surface having a predetermined diameter and axial length and spaced radially outwardly from said inner surface, and a tubular support member surrounding said outer surface, said support member being of an axial length equal to at least a major portion of the axial length of said outer surface and having an inner diameter substantially similar to the diameter of said outer surface for close surrounding engagement therewith, said support member having a plurality of through openings.

In accordance with another aspect of the invention there is provided an inflatable vehicle occupant restraint system inflator module comprising a cylindrical housing having generally circular top and bottom walls and a tubular side wall extending therebetween, said walls defining a chamber therein; a tubular filter located within said chamber and having an outer surface in proximity to an inner surface of said side wall; said filter comprising a tubular filter element having a generally cylindrical inner surface and a generally cylindrical outer surface of a predetermined diameter and axial length and spaced radially outwardly from said inner surface, and a tubular metal support member surrounding said outer surface of said filter element, said support member being of an axial length equal to at least a major portion of the axial length of said outer surface of said filter element and having an inner diameter substantially similar to the diameter of said outer surface of said filter element for close surrounding engagement therewith, said support member having a plurality of through openings, and an outer surface of said support member comprising an outer surface of the filter.

In accordance with yet a further aspect of the invention there is provided a method of forming a filter for an inflatable vehicle occupant restraint module, said method comprising the steps of: providing a tubular filter element having a generally cylindrical inner surface and a generally cylindrical outer surface having a given diameter and axial length and spaced radially outwardly from said inner surface; providing a tubular support member of an axial length equal to at least a major portion of the predetermined axial length of said outer surface and having an inner diameter substantially similar to the diameter of said outer surface; and engaging said support member in close circumferential supporting engagement about said filter element outer surface.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description, taken in connection with the accompanying drawings in which like reference numerals identify like elements, and in which:

DETAILED DESCRIPTION OF THE ILLUSTRATED EMBODIMENT

Figure 1:
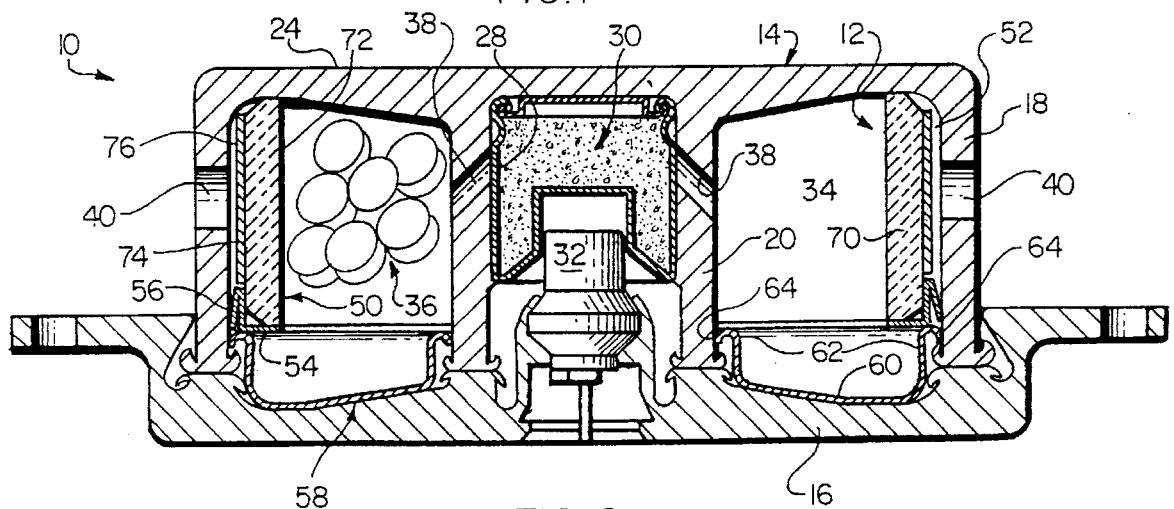
FIG. 1 is a section in elevation through an inflator housing employing a filter in accordance with the invention.

Referring now to the drawings, and initially to FIG. 1, there is illustrated an inflator 10 which utilizes a filter 12 constructed in accordance with the invention. In the illustrated embodiment, a relatively short, cylindrical inflator 10 is shown, suitable for use in a driver's side air bag restraint system mounted to a steering wheel (not shown). However, it will be understood that the invention is also useful in connection with an inflator formed as a somewhat elongated cylinder for use with a passenger's side air bag restraint system.

In the illustrated embodiment, the inflator 10 includes a housing 14 which has a generally circular bottom wall 16 and a generally cylindrical outer peripheral wall 18. Spaced radially inwardly of the outer peripheral wall 18 is a generally cylindrical wall 20. The walls 18 and 20 extend from a circular upper wall 24. Normally, the upper wall 24 and the two cylindrical walls 18 and 20 are integrally formed as a unit, with such a combined unit being often referred to as a diffuser. This unit or diffuser is then connected to the bottom wall 16, typically by welding. It will be seen that the bottom wall 16 has a pair of generally annular, short, upwardly extending surfaces or rings which respectively align with and engage the outer wall 18 and inner wall 20.

The walls 18 and 20 define a pair of chambers. Interiorally of the inner wall 20 there is formed a generally cylindrical ignition chamber 28 which will be partially filled with an ignition material 30 and which also accommodates an initiator or squib 32. Radially surrounding the wall 20 and inside of the outer wall 18 is a second, generally annular generator chamber 34 which receives a volume of pyrotechnic gas generant material 36. This material may have various compositions such as an azide, and may be in many forms, a tablet form being here partially illustrated for purposes of description. It will be understood that in practice the tablets 36 substantially fill the chamber 34. The inner wall 20 includes a plurality of through openings or ignition ports 38 which extend between the ignition and generator chambers 28, 34 to permit the hot gases from the ignition material 30 to flow into the generator chamber 34 and cause the generant material 36 to generate an inflating gas.

The outer wall 18 is provided with a plurality of through openings or gas exit ports 40 through which the generated inflation gases exit to fill the inflatable cushion or air bag (not shown) which is in generally surrounding relation to the diffuser. Spaced radially outwardly of the gas generant 36 and radially inwardly of the outer wall 18 is a generally annular or tubular filter 50. The filter 50 is provided generally in order to prevent particulate matter or slag from the gas generant 36 from reaching the inflatable cushion and also to cool the gases somewhat prior to their admission to the inflatable cushion. The filter 50 is constructed in accordance with the invention, as will be more fully described hereinbelow.

In the illustrated embodiment, the outermost surface of the filter 50 is spaced radially inwardly of the inner surface of the wall 18, to form or define a plenum chamber 52 therebetween. This plenum chamber or space 52 between the filter and the inner surface of the inflator housing outer wall 18 helps to cause the gas to flow through as large an area of the filter as possible increasing gas flow therethrough and improving filter efficiency.

In order to assure that the gas passes through rather than around the filter 50, an additional positioning and sealing member or ring 54, preferably of a resilient sheet metal or like material, is provided. This ring 54 will be seen to embrace a lower edge of the filter 50 and provides a resilient, generally annular angularly outwardly extending skirt portion 56 which is inwardly compressed by, and seals against, the inner surface of wall 18. This skirt 56 also helps to radially center the filter relative to the wall 18 and thus define a substantially uniform radial extent or width of the plenum space or chamber 52. The ring 54 also serves to press an upper edge of the filter 50 against the inner surface of the upper wall 24 thus serving as a seal or closure at the upper end of the filter, such that gas must pass through the filter 50 in order to reach the exit ports 40. Other means for sealing and positioning the filter 50 may be provided without departing from the invention.

In order to secure and protect the gas generant 36 during the assembly and welding of the bottom wall 16 to the diffuser comprising top wall 24 and side walls 18 and 20, there is provided a retainer 58. This retainer 58 is generally annular in form, in the illustrated embodiment having an annular main portion 60 which is generally in the form of a shallow cone. Projecting from opposite ends of this main portion 60 at either edge is an upward turn 62 and then a radially outwardly reverse turn 64. The free edge of the outer reverse turn 64 is made slightly larger than the diameter of the inner surface of outer wall 18, while the diameter of the inner reverse turn is of somewhat smaller diameter than the outer diameter of the wall 20. As such, the retainer 68 may be pressed upwardly to resiliently depress inwardly the respective reverse turned walls 64 thereof, whereupon the latter respectively engage about the outer surface of wall 20 and inner surface of wall 18. Thus, the gas generant 36 may be initially introduced into the chamber 34 and thereupon the retainer pushed into position to retain and cover the generant while the housing bottom wall 16 is assembled with the diffuser comprising the circular wall 24 and cylindrical walls 18 and 20 of the housing.

Figure 2:
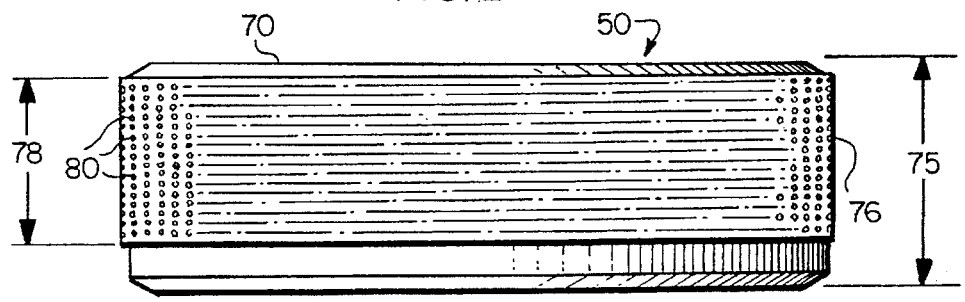
FIG. 2 is a side elevation of a filter in accordance with the invention.
Figure 3:
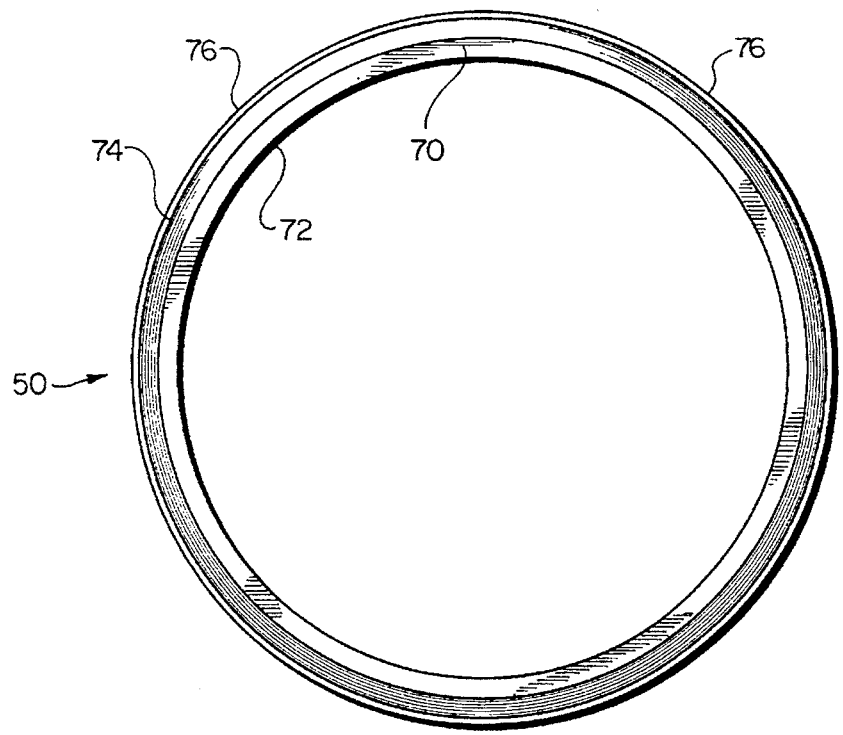
FIG. 3 is a top plan view of the filter of FIG. 2.

Referring now also to FIGS. 2 and 3, the filter 50 will be seen to comprise a tubular filter element 70 which has a generally cylindrical inner surface 72 and a generally cylindrical outer surface 74 which is parallel and spaced radially outwardly from the inner surface 72. A generally tubular support member 76 circumferentially surrounds and engages the outer surface 74 of the filter element 70. This tubular support member is formed to have an axial height 78 which is at least equal to a major part of the axial height 75 of the outer surface 74 of the filter element 70. The inner diameter of the support member 76 is substantially similar to the diameter of the outer surface 74 of the filter element for close surrounding supportive engagement therewith.

The support member 76 will be seen to have a plurality of through openings 80. Preferably, the filter element 70 is constructed as a unitary, integrally formed ceramic member, that is, constructed in a single piece. This unitary filter may be formed from ceramic, powdered metal, metal fiber, or any combination of two or more of these porous relatively brittle materials. Preferably the support member is a metal material. The through openings 80 in the support member may be of a wide range of sizes. However, these are generally sized so as to permit gas flow through the support member at a rate substantially consistent with the rate of gas flow through the filter element 70 (that is, so as to not significantly reduce the flow) while yet maintaining sufficient unperforated surface area of the support element 76 to provide support of the filter element in such a manner as to counteract hoop stress in the filter element 70. The construction of the support member may take any form consistent with this function, namely to permit gas flow relatively freely therethrough while providing support to counteract hoop stress in the unitary filter element 70. It will be appreciated that such hoop stress will occur as a result of the radially outward pressure exerted on the filter element 70 by the gases being filtered through the filter element 70.

Accordingly, the support member 76 may be constructed as a tube of perforated metal, or may be formed from a wire screen mesh material, or may be formed from an expanded metal material.

In order to assure, as desired, resistance to hoop stress is imparted to the filter element 70 by the support member 76, there may be provided a press fit therebetween such that the support member 76 actually applies radially inward compressive forces to the outer surface 74 of the filter element 70. One method of accomplishing this is to size the support member such that its inner diameter is about the same as the outer diameter 74 of the filter element. Then, in order to assemble the support member 76 about the filter element, the support member 76 is heated to cause it to expand somewhat, and thereupon the heated and expanded support member is engaged about the filter member outer surface 74, then the support member cools and contracts somewhat thereby producing a radially inward compressive force on the filter element 70 about its outer surface 74.

In an alternate form of construction, it is contemplated that the support member 76 could in some cases function as the radially outer wall of the inflator housing 14, eliminating the need for the outer wall 18.

While particular embodiments of the invention have been shown and described in detail, it will be obvious to those skilled in the art that changes and modifications of the present invention, in its various aspects, may be made without departing from the invention in its broader aspect, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. A filter for an inflatable vehicle occupant restraint inflator, said filter comprising: a tubular filter element having a substantially cylindrical interior surface and a substantially cylindrical outer surface having a predetermined diameter and a predetermined axial length and spaced radially outwardly from said inner surface, said filter element being formed of a porous, relatively brittle material subject to fracture due to hoop stress, and a tubular support member surrounding said outer surface, said support member being of an axial length equal to at least a major portion of the axial length of said outer surface and having an inner diameter substantially equal to the diameter of said outer surface for close surrounding engagement therewith, said support member having a plurality of through openings and being constructed of a material not subject to fracture due to hoop stress for supporting said filter element in such a way as to counteract hoop stress in said filter element.

2. A filter according to claim 1 wherein said filter element is constructed of a material selected from a group comprising ceramic, powdered metal, metal fiber and a combination of two or more of said materials, and said support member is constructed of a metal material.

3. A filter according to claim 1 wherein said cylindrical inner wall of said support member has an axial length at least as great as the axial length of said cylindrical outer wall of said filter element.

4. A filter according to claim 1 wherein said through openings in said support member are sized to permit gas flow therethrough at a flow rate consistent with a rate of gas flow through said filter element while maintaining sufficient solid, unperforated surface area of said support member to support said filter element in such a manner as to counteract hoop stress in said filter element.

5. A filter according to claim 1 wherein said support member comprises a tube constructed of perforated metal.

6. A filter according to claim 1 wherein said support member is formed from a wire screen mesh material.

7. A filter according to claim 1 wherein said support member is formed from an expanded metal material.

8. An inflatable vehicle occupant restraint system inflator comprising: a cylindrical housing having substantially circular top and bottom walls and a tubular side wall extending therebetween, said walls defining a chamber therein; and a tubular filter located within said chamber and having an outer surface in proximity to an inner surface of said side wall; said filter comprising a tubular filter element having a substantially cylindrical inner surface and a substantially cylindrical outer surface of a predetermined diameter and a predetermined axial length spaced radially outwardly from said inner surface, said filter element being formed of a porous, relatively brittle material subject to fracture due to hoop stress, and a tubular support member surrounding said outer surface of said filter element, said support member being of an axial length equal to at least a major portion of the axial length of said outer surface of said filter element and having an inner diameter substantially equal to the diameter of said outer surface of said filter element for close surrounding engagement therewith, said support member having a plurality of through openings and being constructed of a material not subject to fracture due to hoop stress for supporting said filter element in such a way as to counteract hoop stress in said filter element, and an outer surface of said support member comprising an outer surface of the filter.

9. An inflator according to claim 8 wherein the outer surface of said filter has a diameter less than an inner diameter of said sidewall to define a plenum therebetween.

10. An inflator according to claim 8 wherein said sidewall has a plurality of gas exit ports extending therethrough.

11. An inflator according to claim 8 wherein said filter member is constructed of a material selected from a group comprising ceramic, powdered metal, metal fiber and a combination of two or more of said materials, and said support member is constructed of a metal material.

12. An inflator according to claim 8 wherein said through openings in said support member are sized to permit gas flow therethrough at a flow rate consistent with a rate of gas flow through said filter element while maintaining sufficient solid, unperforated surface area of said support member to support said filter element in such a manner as to counteract hoop stress in said filter element.

13. An inflator according to claim 8 wherein said support member comprises a tube constructed of perforated metal.

14. An inflator according to claim 8 wherein said support member is formed from a wire screen mesh material.

15. An inflator according to claim 8 wherein said support member is formed from an expanded metal material.

* * * * *